United States Patent [19]

Huffman

[11] Patent Number: 4,690,573
[45] Date of Patent: Sep. 1, 1987

[54] ADJUSTER FOR THRUST WASHER WEAR

[75] Inventor: Joseph L. Huffman, Marion, Ohio

[73] Assignee: Dresser Industries, Inc., Dallas, Tex.

[21] Appl. No.: 928,214

[22] Filed: Nov. 7, 1986

[51] Int. Cl.4 .............................................. F16C 25/02
[52] U.S. Cl. ..................................... 384/251; 384/626
[58] Field of Search ............... 384/251, 248, 626, 240, 384/243, 426, 519, 583

[56] References Cited

U.S. PATENT DOCUMENTS

| 310,386 | 1/1885 | Coop . | |
|---|---|---|---|
| 381,043 | 4/1888 | Vauclain . | |
| 615,119 | 12/1898 | Williamson . | |
| 1,061,899 | 5/1913 | Chinnick . | |
| 1,390,417 | 9/1921 | Yarbrough . | |
| 1,649,189 | 11/1927 | Rockenstire . | |
| 1,721,363 | 7/1929 | Wesp | 384/248 |
| 1,748,412 | 2/1930 | Crawford | 384/626 |
| 1,777,259 | 9/1930 | Ermert . | |
| 1,805,800 | 5/1931 | Berger . | |
| 2,468,419 | 4/1949 | Weber . | |
| 2,772,596 | 12/1956 | Trussell | 384/626 |
| 4,530,144 | 7/1985 | Hagelthorn | 384/248 |

Primary Examiner—Lenard A. Footland

[57] ABSTRACT

A take up adjuster for a swivel mounted on a structure for swiveling about a pin which utilizes a first pair of wedge plates having sloping surfaces therein for moving towards each other and a second pair of wedge plates having complimentary sloping surfaces thereon and slidably abutting the sloping surface of and contained by the first pair of wedge plates so that by moving the first wedge plates towards each other, the second wedge plates are raised upwardly to occupy any space that may exist between the swivel and the structure on which it is mounted.

4 Claims, 11 Drawing Figures

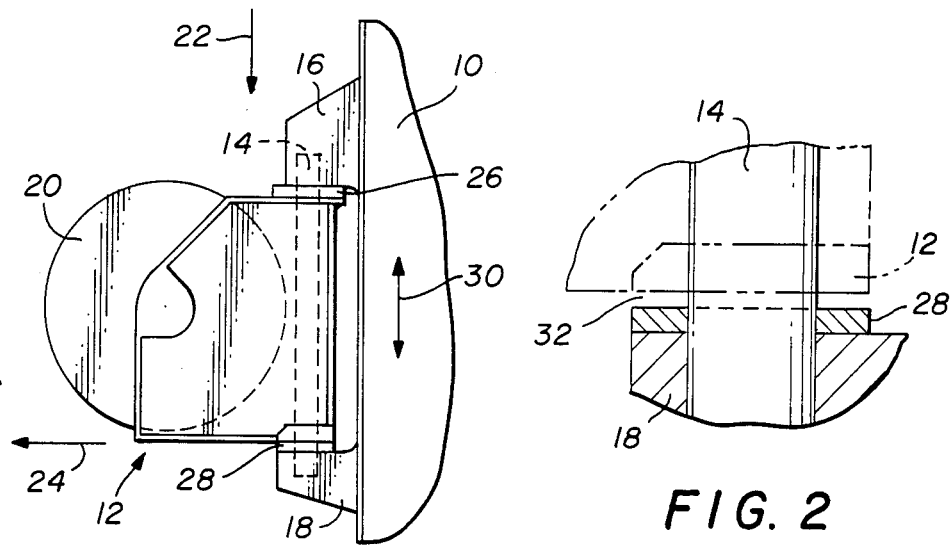
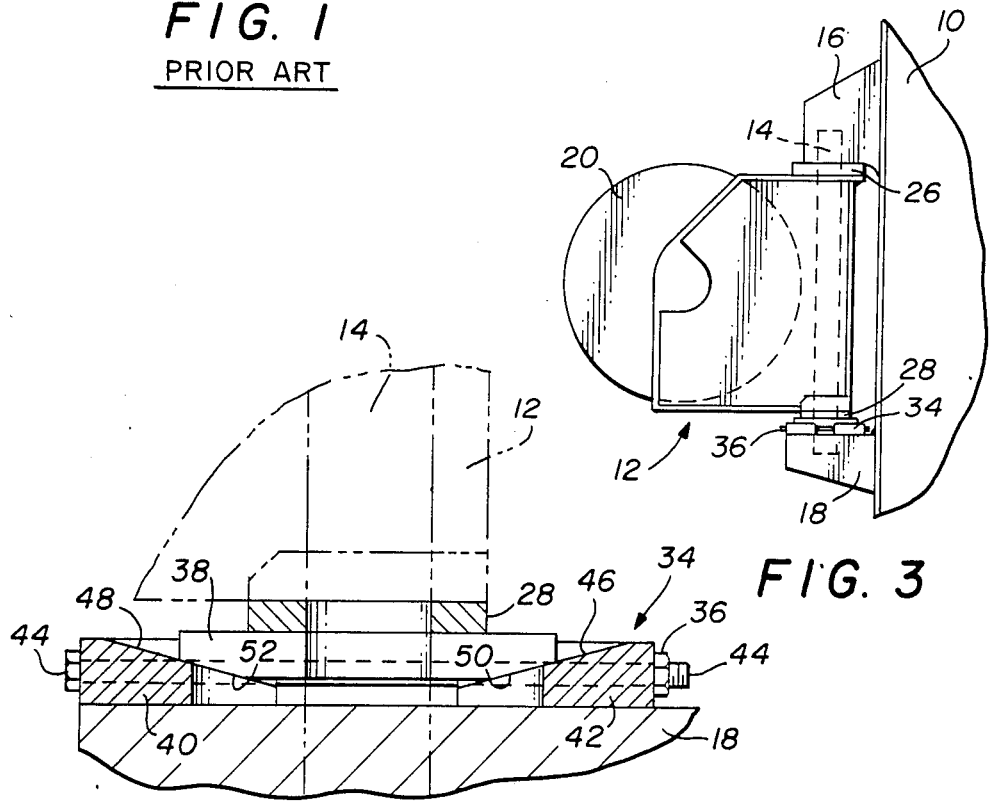
FIG. 1 PRIOR ART
FIG. 2 PRIOR ART
FIG. 3
FIG. 4

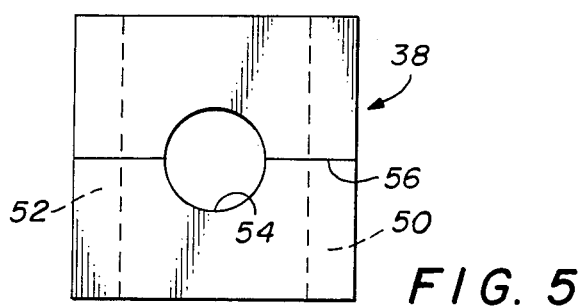
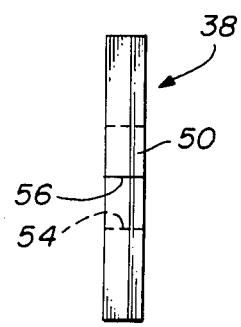
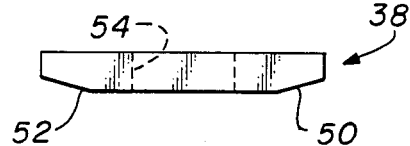
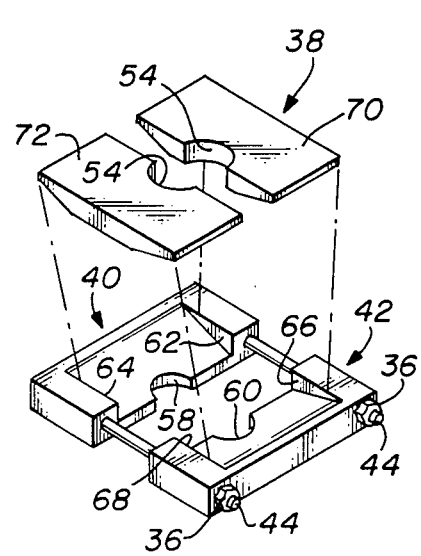
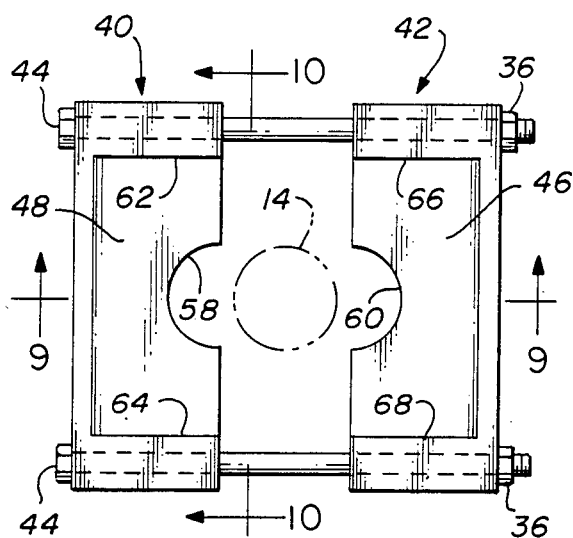
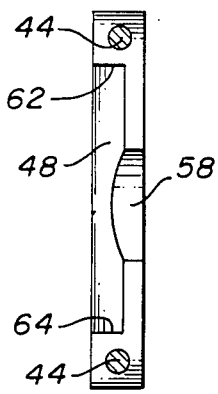
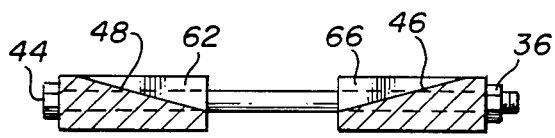

ADJUSTER FOR THRUST WASHER WEAR

BACKGROUND OF THE INVENTION

The present invention relates to a take up adjuster for thrust washer wear and in particular relates to a set of upper and lower solid steel wedges placed between thrust washers and a swivel mount and constructed so that maintenance personnel can quickly and easily take up the clearance between a swivel bracket and thrust washers supporting the bracket by tightening a pair of bolts which draws the lower wedges together thereby raising the upper wedge and increasing the thickness of the adjuster assembly.

In heavy machinery such as draglines, cable sheaves are mounted in swivel brackets which are pinned to a swivel mount on the structure at various locations. The swivel bracket wears on thrush washers located on the pin at the top and bottom of the swivel bracket. As the washers wear due to the swiveling of the bracket, the clearance between the thrust washers and the swivel bracket opens or increases thus allowing the swivel assembly to jack up and down inducing impact loads against the mounting structure and causing heavy vibration throughout the machine. Inasmuch as great loads are applied to these sheaves, tremendous forces are applied to the swivel assembly thus causing damage to the equipment as the clearance between the bracket and the thrust washers increase due to wear. To correct this problem, the machine must be idled while the pin on which the swivel bracket is mounted is removed and shims added to form a shim pack and collar assembly on the pin to take up the space between the swivel bracket and the thrust washer caused by wear thus preventing the up and down movement of the swivel assembly which creates the damage to the equipment. Obviously this requires not only the idling of the machine but additional time and expense of the maintenance personnel to remove the pin, insert the shim pack and collar assembly of the proper dimensions in the space where the wear has taken place and replace the pin. Further, an assortment of various sizes of shims must be kept in stock so that the space caused by wear can be accurately filled.

The proposed invention eliminates these problems by eliminating the shim pack assembly. A set of solid steel wedges are constructed so that maintenance personnel can quickly and easily take up the clearance at the swivel bracket simply by tightening a pair of bolts which draws a pair of lower wedges together thereby raising at least one upper wedge and increasing the thickness of the adjuster assembly until the space caused by wear has been eliminated. The adjuster utilizes a pair of lower wedge plates having bolts connecting them to pull them together and at least one upper wedge plate mounted about the pin and having wedge surfaces in contact with corresponding wedge surfaces of the lower wedge plate so that when the lower wedge plates are brought closer together, the upper wedge is raised Thus no disassembly and reassembly of parts is required to make the adjustment as is needed with the present shim pack. Further, adjustment can be made quickly with only a wrench. There is also no need to stock extra parts such as shims as in the prior art. In addition, the adjuster indicates when the thrust washers must be replaced. In such case, the lower wedges come together when the limit is reached and can be adjusted no further. At that point, new thrust washers must be added. Also, a more accurate and complete adjustment can be achieved with the present invention since it is impossible to remove all clearance with the shims of the prior art since an infinite variety of shim thicknesses can not be maintained. There are fewer parts to the present invention and it can be made to retrofit existing machines with no other modifications.

Thus it is an object of the present invention to provide a take up adjuster for a swivel device mounted on a structure for swiveling on thrust washers about a pin wherein the adjusting body is positioned about the pin between at least one thrust washer and the mounting structure and comprising a first pair of wedge plates positioned on diametrically opposed sides of the pin and a second wedge positioned about the pin and having wedge surfaces complimentary to and in sliding engagement with the first pair of wedge plates so that when the first pair of wedge plates are forced closer to each other, the second wedge is raised upward to fill the space existing between the mounting structure and the swivel thrust washer.

SUMMARY OF THE INVENTION

Thus the present invention relates to a take up adjuster for a swivel device mounted on a structure for swiveling on at least one thrust washer about a pin comprising an adjusting body positioned about the pin to take up the space caused by wear of at least one thrust washer, the adjusting body comprising a first pair of wedge plates positioned on diametrically opposed sides of the pin and a second wedge positioned about the pin and having a wedge surface complimentary to and in sliding engagement with the first pair of wedge plates, a recess formed in the first pair of wedge plates for receiving and maintaining the second wedge in the sliding engagement with the first pair of wedge plates and means for moving the first pair of wedge plates toward and away from each other so as to raise and lower the second wedge and eliminate unnecessary space between the swivel thrust washer and the structure as wear occurs with use.

The invention also relates to a method of taking up the space between a swivel and a structure on which the swivel is rotatably mounted on a pin with thrust washers located on said pin between said swivel and said structure, the improved method comprising the steps of positioning an adjusting body between the structure and said thrust washers, the positioning step further comprising the steps of positioning a first pair of wedge plates on diametrically opposed sides of the pin, and positioning a second wedge about the pin and having wedge surfaces complimentary to and in sliding contact with the first pair of wedge plates, containing the second wedge in sliding engagement with the first pair of wedge plates, and moving the first pair of wedge plates toward each other so as to raise the second wedge and eliminate unnecessary space between the swivel and the structure as wear of the thrust washer occurs from use.

BRIEF DESCRIPTION OF THE DRAWINGS

These and other objects of the present invention will be more clearly understood in conjunction with the accompanying drawings in which like numeral represent like components and in which:

FIG. 1 is a partial diagrammatic representation of a prior art sheave and swivel;

FIG. 2 is a partial schematic representation of a thrust washer mounted between the swivel and the structure and illustrating the gap that is formed when wear occurs on the thrust washer;

FIG. 3 is a partial schematic representation of a sheave and swivel having the present invention utilized to take up any space between the sheave swivel and the structure;

FIG. 4 is an enlarged schematic representation of the present invention illustrating the first pair of wedges movable towards each other to raise a second wedge and take up any space existing between the swivel and the thrust washer;

FIG. 5 is a top view of the upper wedge plate utilizing the present invention;

FIG. 6 is a side view of the upper wedge plate of the present invention;

FIG. 7 is an end view of the upper wedge plate of the present invention;

FIG. 8 is a top view of the lower wedge plates of the present invention;

FIG. 9 is a cross-sectional side view of the lower wedge plates of the present invention;

FIG. 10 is a cross-sectional end view of the lower wedge plates of the present invention; and FIG. 11 is an exploded isometric view illustrating how the abutting upper wedge plates are contained in the abutting lower wedge plates.

DETAILED DESCRIPTION OF THE DRAWINGS

FIG. 1 is a partial schematic illustration of the swivel and sheave of the prior art. A frame structure 10 has attached thereto a swivel and sheave structure 12 by means of a pin(s) 14 in any well-known manner. For instance the pin may be inserted through appropriate orifices in mounting brackets 16 and 18 which are formed as a part of the machine structure 10. Typically, a cable passes over sheave 20 from the top in the general direction of arrow 22 and exits the sheave in the general direction of arrow 24. Thrust washers 26 and 28 are mounted on the top and bottom respectively of the swivel assembly 12 to take up any space which may exist between the swivel 12 and the structure 10. Since swivel 12 is pivoting about pin 14 during its normal operation, wear is induced on thrust washers 26 and 28. As more and more wear occurs, a space is formed which allows the swivel assembly 12 to move up and down in the direction of arrow 30 which, because of the large forces applied to the swivel unit 12, causes a great deal of vibration, noise and eventually damage to the equipment.

As can be seen in the enlarged view shown in FIG. 2, a gap 32 is formed because of the wear between thrust washer 28 and swivel unit 12. In order to take up gap 32 so as to prevent the damage to the equipment or the vibration caused by the movement of swivel 12 up and down, the machine must be stopped, pin 14 removed, and appropriate shims placed in the gaps and the pin reinserted. This of course requires a great deal of time, loss of operating time of the machine and the requirement that spare shims be kept on hand for the repair of the unit.

FIG. 3 illustrates how the present invention is utilized to overcome the problems in the prior art caused by the wearing of the thrust washers 26 and 28. As can be seen in FIG. 3, a take up adjuster 34 which comprises the present invention, is placed about pin 14 between thrust washer 28 and the bracket 18 which is formed as part of structure 10. The take up adjuster 34 is provided with a bolt or nut 36 which can be adjusted to cause a pressure to be applied upwardly against thrust washer 28 to take up any gap or space that may exist. Thus as swivel 12 wears thrust washers 26 and 28 to form a gap, the machine is stopped and the operator simply tightens nut or bolt 36 until the gap is removed and operations can again resume.

An enlarged embodiment of the present invention is shown in FIG. 4. As can be seen in FIG. 4, the take up adjuster 34 is illustrated in cross-section and comprises a first wedge 38 and a lower pair of wedges 40 and 42 which are coupled to each other by means of a bolt 44 having nut 36 thereon. As any wear of thrust washer 28 occurs in FIG. 4, nut 36 is simply tightened which draws wedge plates 40 and 42 towards each other in FIG. 4. Because these plates have sloping surfaces 46 and 48 on which corresponding sloping surfaces 50 and 52 of wedge 38 mate, the upper wedge 38 is forced upwardly by the inward movement of wedge plates 40 and 42. Thus any slack or gap existing between thrust washer 28 and swivel 12 caused by wearing of thrust washer 28 is taken up or eliminated by the adjustment of nut 36. This adjustment is, therefore, very simple and does not require any significant amount of time or effort. Loss of machine operating time is greatly reduced. Further, when wedge plates 40 and 42 have moved towards each other as far as possible, then the machine must be stopped and the thrust washers 26 and 28 replaced as is normally the case. Thus the present invention is effective, efficient and economical to operate and eliminates the need to stock a great number of replacement shims.

The upper wedge 38 is illustrated in FIG. 5 in a top view and may be a single unit having an orifice 54 therein or may be divided along line 56 to form two units which are in abutting relationship.

FIG. 6 is a side view of the upper wedge 38 shown in FIG. 5 and illustrates the sloping surfaces 50 and 52.

FIG. 7 is an end view of the upper wedge shown in FIG. 5 and the sloping surface 50 can be seen.

FIG. 8 is a top view of the lower pair of wedge plates 40 and 42 illustrating the manner in which they are mounted about pin 14. Each of the wedges 40 and 42 have a semi-circle 58, 60 formed therein so as nuts 36 are tightened and wedge plates 40 and 42 move towards each other, they can accommodate the pin 14. Wedge plate 42 has a sloping surface 46 while wedge plate 40 has a sloping surface 48. These slopes form wall members 62, 64, 66 and 68 which contain the upper wedge or wedge plates 38 in proper orientation.

FIG. 9 is a cross-sectional side view of the lower wedge plates 40 and 42 shown in FIG. 8 and illustrates the walls 62 and 66 formed by sloping surfaces 48 and 46.

FIG. 10 is a side view taken along lines 10—10 in FIG. 8.

FIG. 11 is an isometric view of the upper and lower wedge plates illustrating the manner in which they nest together in slideable arrangement. As can be seen in FIG. 11, the upper wedge plate 38 is illustrated as being formed by two abutting plates 70 and 72 each having a semi-circular orifice 54 therein such that when they are in a abutting relationship a circular orifice 54 is formed for cooperation with the pin 14. In like manner, each of the lower wedge plates 40 and 42 has the semi-circle 58 or 60 therein which allows those plates to move towards each other about pin 14. It can be noted in FIG. 11 that the upper pair of wedge plates 38 are sized so as to fit within walls 62, 64, 66 and 68 of the lower wedge plates 40 and 42 thereby being contained therein in a slideable relationship.

Thus there has been disclosed a novel take up adjuster for thrust washer wear which can be inserted about a pin holding two moveable or pivotable parts together such that when wear occurs because of the movement of one part relative to the other, a simple adjustment can be made which will eliminate any gap or space caused by the wear of the parts due to the relative motion thereof. The take up adjuster includes an upper wedge plate or plates which nests in a recess formed in a lower pair of wedge plates which are moveable towards each other. Because the upper wedge plate or plates have sloped surfaces engaging like sloped surfaces on the lower wedge plates, movement of the lower wedge plates toward each other cause the upper wedge plates to slide along the sloping lower surfaces thus raising the upper wedge to fill any space that may exist.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as described in the appended claims.

What is claimed is:

1. A take up adjuster for a swivel mounted on a structure for swiveling about a pin comprising:
   a. an adjusting body positioned about said pin between said swivel and said structure, said adjusting body comprising;
      i. a first pair of wedge plates having sloping surfaces and positioned on diametrically opposed sides of said pin,
      ii. a second wedge positioned about said pin and having sloping surfaces complimentary to and in sliding engagement with said sloping surface of said first pair of wedge plates,
   b. means for containing said second wedge in sliding engagement with said first of pair wedge plates, and
   c. means for moving said first pair of wedge plates toward each other so as to raise said second wedge and eliminate unnecessary space between said swivel and said structure as wear occurs from use.

2. A take up adjuster as in claim 1 wherein said second wedge comprises:
   a. a pair of cooperating wedges positioned about said pin,
   b. a semi-circular orifice formed in each of said wedges to form a circular orifice for said pin when said cooperating wedges are in abutting relationship, and
   c. a recess in said first pair of wedge plates for containing said pair of cooperating wedges on diametrically opposed sides of said pin and rotated 90° from said diametrically opposed first wedge plates.

3. A take up adjuster as in claim 2 wherein said first pair of wedge plates comprises:
   a. each of said first pair of cooperating wedge plates having a semi-circular orifice therein to form a circular orifice for said pin when said wedge plates are in abutting relationship, and
   b. at least one screw member coupled to said pair of plates for movement of said wedge plates toward each other to raise said second wedge.

4. A take up adjuster as in claim 3 wherein said first pair of wedge plates further comprises:
   a. a wall formed on each side of said first wedge plates for forming said recess for containing said second wedge,
   b. an orifice in each of said side walls on each of said first wedge plates, the side wall orifices in one of said first wedge plates being in axial alignment with corresponding ones of said orifices in the side walls of the other of said wedge plates and,
   c. a screw device extending through said corresponding axially aligned orifices in said side walls such that tightening said screw device draws said first pair of wedge plates toward each other to raise said second wedge.

* * * * *